(12) United States Patent
Tobari et al.

(10) Patent No.: US 11,424,707 B2
(45) Date of Patent: Aug. 23, 2022

(54) POWER CONVERSION APPARATUS

(71) Applicant: Hitachi Industrial Equipment Systems Co., Ltd., Tokyo (JP)

(72) Inventors: Kazuaki Tobari, Tokyo (JP); Yoshitaka Iwaji, Tokyo (JP); Agnes Hadinata, Tokyo (JP); Yusaku Onuma, Tokyo (JP); Atsuhiko Nakamura, Tokyo (JP); Takuya Sugimoto, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 116 days.

(21) Appl. No.: 17/049,979

(22) PCT Filed: Dec. 26, 2018

(86) PCT No.: PCT/JP2018/047939
§ 371 (c)(1),
(2) Date: Oct. 23, 2020

(87) PCT Pub. No.: WO2020/003560
PCT Pub. Date: Jan. 2, 2020

(65) Prior Publication Data
US 2021/0152113 A1 May 20, 2021

(30) Foreign Application Priority Data
Jun. 28, 2018 (JP) .............................. JP2018-122783

(51) Int. Cl.
*H02P 21/22* (2016.01)
*H02P 21/16* (2016.01)
(Continued)

(52) U.S. Cl.
CPC .............. *H02P 21/22* (2016.02); *H02M 1/00* (2013.01); *H02P 21/16* (2016.02); *H02P 21/18* (2016.02); *H02M 1/0009* (2021.05)

(58) Field of Classification Search
CPC .......... H02P 21/22; H02P 21/16; H02M 1/00; H02M 1/0009
See application file for complete search history.

(56) References Cited

U.S. PATENT DOCUMENTS

2003/0052640 A1* 3/2003 Iwaji ........................ H02P 21/24
318/700
2008/0265809 A1* 10/2008 Ol ............................. H02P 21/06
318/722
(Continued)

FOREIGN PATENT DOCUMENTS

CN 105680738 A 6/2016
JP 2013-126352 A 6/2013
(Continued)

OTHER PUBLICATIONS

Extended European Search Report received in corresponding European Application No. 18924485.8 dated Mar. 1, 2022.
(Continued)

*Primary Examiner* — Rina I Duda
(74) *Attorney, Agent, or Firm* — Mattingly & Malur, PC

(57) ABSTRACT

A power conversion apparatus controls a load apparatus by position sensorless vector control. The power conversion apparatus includes: a current detection unit configured to detect a current passing through the load apparatus; a current detection arithmetic unit configured to calculate a harmonic current component on a dc-axis as a control axis and a harmonic current component on a qc-axis, based on the detected current; a saliency ratio estimation unit configured to output a saliency ratio estimated value based on the harmonic current component on the dc-axis and the har-
(Continued)

monic current component on the qc-axis; and a saliency ratio control unit configured to output a current component that increases or decreases a current command value on a d-axis of a rotor coordinate system, based on a deviation between the saliency ratio estimated value and a predetermined saliency ratio.

13 Claims, 11 Drawing Sheets

(51) Int. Cl.
    *H02P 21/18*     (2016.01)
    *H02M 1/00*     (2006.01)

(56) References Cited

U.S. PATENT DOCUMENTS

| | | |
|---|---|---|
| 2009/0027000 A1 | 1/2009 | Gallegos-Lopez et al. |
| 2014/0062353 A1* | 3/2014 | Oyobe .................. H02P 21/22 318/400.02 |
| 2014/0176028 A1* | 6/2014 | Tobari .................. B60L 3/003 318/400.15 |
| 2014/0327379 A1* | 11/2014 | Yang .................. H02P 6/183 318/400.11 |
| 2014/0340018 A1* | 11/2014 | Hachiya .................. H02P 21/18 318/504 |
| 2017/0317623 A1* | 11/2017 | Taniguchi .................. H02P 6/18 |

FOREIGN PATENT DOCUMENTS

| | | |
|---|---|---|
| JP | 2013-192325 A | 9/2013 |
| WO | 2015/190150 A1 | 12/2015 |

OTHER PUBLICATIONS

Gu, M. et al., "Novel PWM Schemes with Multi SVPWM of Sensorless IPMSM Drives for Reducing Current Ripple", IEEE Transactions on Power Electronics, Sep. 2016, pp. 6461-6475, vol. 31, No. 9.

Yang, S. et al., "Robust Initial Position Estimation of Permanent Magnet Machine with Low Saliency Ratio", IEEE Access, Mar. 15, 2017, pp. 2685-2695, vol. 5.

International Search Report of PCT/JP2018/047939 dated Mar. 12, 2019.

* cited by examiner

POWER CONVERSION APPARATUS

TECHNICAL FIELD

The present invention relates to a power conversion apparatus, and particularly relates to a power conversion apparatus that enables position sensorless control.

BACKGROUND ART

Examples of a known magnet motor include a surface permanent magnet (SPM) motor in which a permanent magnet is disposed on a surface of a rotor, and an interior permanent magnet (IPM) motor in which a permanent magnet is embedded in a rotor.

Typically, in an SPM motor, since a magnetic resistance is irrelevant to the position of a rotor, a ratio between a d-axis inductance $L_d$ and a q-axis inductance $L_q$ (hereinafter, this ratio $L_q/L_d$ is referred to as a saliency ratio) is approximately 1. Meanwhile, in an IPM motor, a current magnetic flux in a d-axis direction is hard to pass due to the presence of a permanent magnet having a larger magnetic resistance, and a current magnetic flux in a q-axis direction passes through a core of a rotor having a smaller magnetic resistance. As a result, a saliency ratio is equal to or more than 1.

In view of this circumstance, heretofore, position sensorless control by a harmonic superposition method has been applied only to specially designed IPM motors.

PTL 1 discloses a technique premised on an IPM motor. According to this technique, an alternating-current amplitude of a three-phase harmonic current amplitude is obtained by an arithmetic operation, and a ratio between a maximum value and a minimum value of the harmonic current amplitude is estimated as a saliency ratio. According to the technique disclosed in PTL 1, a limit value of a current command as an output from a speed control system is set for preventing the estimated value of the saliency ratio from falling below a predetermined value.

CITATION LIST

Patent Literature

PTL 1: WO 2015/190150 A1

SUMMARY OF INVENTION

Technical Problem

According to the technique disclosed in PTL 1, the limit value of the current command value is set for preventing step-out to be caused since a saliency ratio of a magnet motor approaches 1 when a rotor receives a lowered current.

In the related art, however, lowering a total current including an id current and an iq current prevents an estimated value of a saliency ratio from falling below a predetermined value. It is therefore difficult to enable position sensorless control for stably driving an IPM motor even at a higher torque. It is also difficult to enable position sensorless control for stably driving an SPM motor even at a higher torque.

An object of the present invention is to provide a power conversion apparatus that enables stable position sensorless control even at a higher torque.

Solution to Problem

A preferred example of the present invention is directed to a power conversion apparatus for controlling a load apparatus by position sensorless control, the power conversion apparatus including: a current detection unit configured to detect a current passing through the load apparatus; a current detection arithmetic unit configured to calculate a harmonic current component on a dc-axis as a control axis and a harmonic current component on a qc-axis, based on the detected current; a saliency ratio estimation unit configured to output a saliency ratio estimated value based on the harmonic current component on the dc-axis and the harmonic current component on the qc-axis; and a saliency ratio control unit configured to output a current component that increases or decreases a current command value on a d-axis of a rotor coordinate system, based on a deviation between the saliency ratio estimated value and a predetermined saliency ratio.

Advantageous Effects of Invention

The present invention embodies a power conversion apparatus that enables stable position sensorless control even at a higher torque.

DESCRIPTION OF EMBODIMENTS

Embodiments will be described in detail below with reference to the drawings.

Embodiment 1

Figure 1:
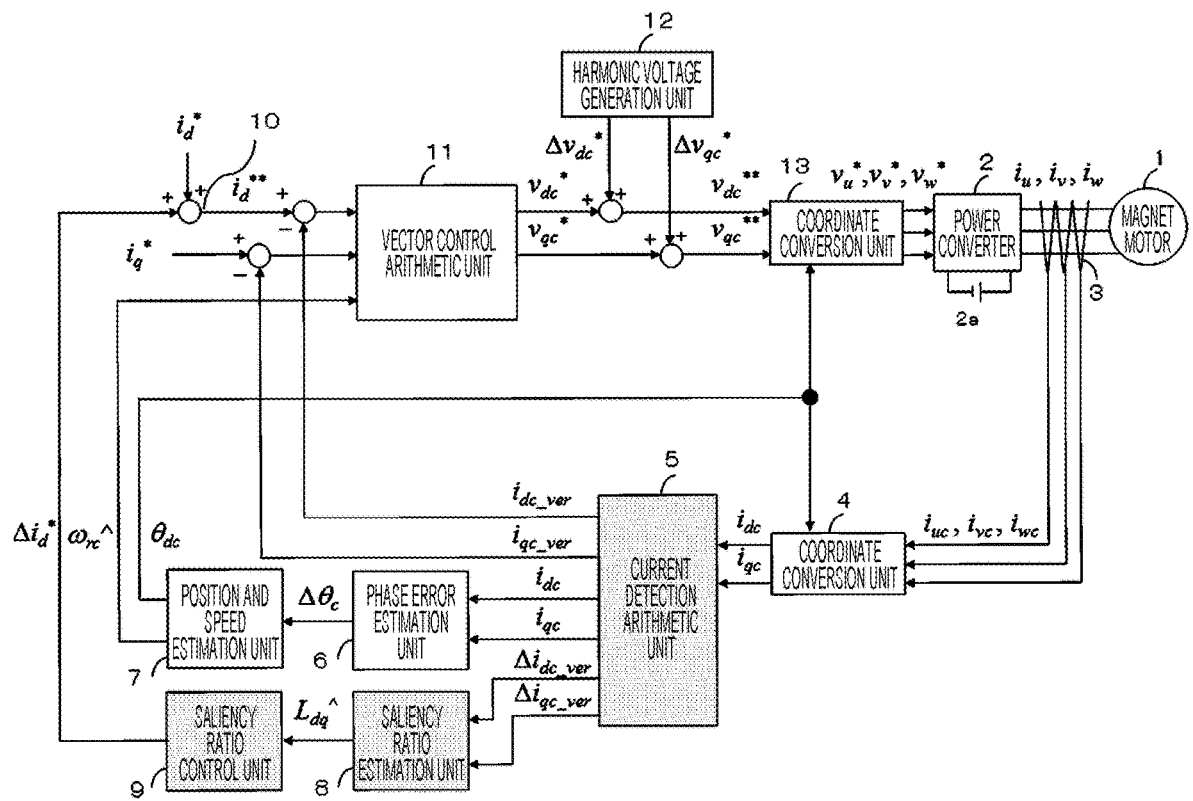
FIG. 1 illustrates a configuration of a system including a power conversion apparatus and a magnet motor in Embodiment 1.

FIG. 1 illustrates a configuration of a system including a power conversion apparatus and a magnet motor in Embodiment 1. A magnet motor 1 outputs a motor torque as a combination of a torque component from a magnetic flux of a permanent magnet with a torque component from an inductance of an armature coil.

A power converter 2 includes a semiconductor element as a switching element. The power converter 2 receives three-phase alternating-current voltage command values $v_u^*$, $v_v^*$, and $v_w^*$, and prepares gate signal (ON, OFF) voltages proportional to the voltage command values $v_u^*$, $v_v^*$, and $v_w^*$. In a case where the power converter 2 includes an insulated gate bipolar transistor (IGBT) as a switching element, the IGBT performs a switching operation based on a gate signal. The power converter 2 also outputs a direct-current voltage $E_{dc}$ as an output from a direct-current voltage source 2a in addition to the voltages proportional to the three-phase alternating-current voltage command values $v_u^*$, $v_v^*$, and $v_w^*$ to make an output voltage and a rotation speed of the magnet motor 1 variable.

A current detector 3 detects three-phase alternating currents $i_u$, $i_v$, and $i_w$ passing through the magnet motor 1. With regard to three-phase currents passing through the magnet motor 1, for example, a u-phase current and a w-phase current may be detected first, and then a v-phase current may be obtained from $i_v = -(i_u + i_w)$ based on the alternating current condition ($i_u + i_v + i_w = 0$). In Embodiment 1, the current detector 3 is provided inside the power conversion apparatus. Alternatively, the current detector 3 may be provided outside the power conversion apparatus.

Next, a description will be given of constituent elements of a control unit configured to control the power converter. A coordinate conversion unit 4 outputs a current detected value $i_{dc}$ on a dc-axis and a current detected value $i_{qc}$ on a qc-axis, based on detected values $i_{uc}$, $i_{vc}$, and $i_{wc}$ of the three-phase alternating currents $i_u$, $i_v$, and $i_w$ with respect to a position estimated value $\theta_{dc}$.

In the following, a description will be given of a rotor coordinate system, a control axis, and others. A dq-axis coordinate system defined with a d-axis and a q-axis is a rotor coordinate system for expressing a magnetic pole position of a rotor. The dq-axis coordinate system rotates in synchronization with a rotor of the magnet motor 1 which is an exemplary load apparatus. In a case where the magnet motor 1 is a permanent magnet synchronous electric motor, the d-axis is typically defined with respect to a phase of a permanent magnet attached to a rotor. The d-axis is also called a magnetic pole axis, and the q-axis is also called a torque axis. A dc-axis and a qc-axis each represent an estimated phase of a magnetic pole position. In other words, the dc-axis and the qc-axis respectively represent a direction along the d-axis and a direction along the q-axis assumed on control by a control unit such as a current detection arithmetic unit 5. The dc-axis is also called a control axis. A dc-qc-axis coordinate system is defined with the dc-axis and the qc-axis perpendicular to the dc-axis.

The current detection arithmetic unit 5 outputs an amplitude value $\Delta i_{dc\_ver}$ of a harmonic current on the dc-axis and an average value $i_{dc\_ver}$, based on a current detected value $i_{dc}$ on the dc-axis. The current detection arithmetic unit 5 also outputs an amplitude value $\Delta i_{qc\_ver}$ on the qc-axis and an average value $i_{qc\_ver}$, based on a current detected value $i_{qc}$ on the qc-axis.

A phase error estimation unit 6 outputs a phase error estimated value $\Delta\theta_c$ based on the current detected value $i_{dc}$ on the dc-axis and the current detected value $i_{qc}$ on the qc-axis.

A position and speed estimation unit 7 outputs a speed estimated value $\hat{\omega}_{rc}$ and a position estimated value $\theta_{dc}$ based on the phase error estimated value $\Delta\theta_c$.

A saliency ratio estimation unit 8 outputs a saliency ratio estimated value $\hat{L}_{dq}$ based on the amplitude value $\Delta i_{dc\_ver}$ of the harmonic current on the dc-axis and the amplitude value $\Delta i_{qc\_ver}$ of the harmonic current on the qc-axis.

A saliency ratio control unit 9 outputs a corrected value $\Delta i_d^*$ of the direct-current component on the d-axis based on the saliency ratio estimated value $\hat{L}_{dq}$.

An addition unit 10 adds a current command $i_d^*$ on the d-axis to the corrected value $\Delta i_d^*$ of the direct-current component on the d-axis, and outputs a second current command $i_d^{**}$ on the d-axis.

A vector control arithmetic unit 11 outputs a voltage command $v_{dc}^*$ on the dc-axis and a voltage command $v_{qc}^*$ on the qc-axis, based on a deviation between the second current command $i_d^{**}$ on the d-axis and the average value $i_{dc\_ver}$, a deviation between the current command $i_q^*$ on the q-axis and the average value $i_{qc\_ver}$, electric constants of the magnet motor 1, and the speed estimated value $\hat{\omega}_{rc}$.

A harmonic voltage generation unit 12 sets a peak value and a frequency for a harmonic voltage, and outputs a harmonic voltage $\Delta v_{dc}^*$ on the dc-axis and a harmonic voltage $\Delta v_{qc}^*$ on the qc-axis.

With respect to the position estimated value $\theta_{dc}$, a coordinate conversion unit 13 outputs three-phase alternating-current voltage commands $v_u^*$, $v_v^*$, and $v_w^*$ to the power converter, based on a value $v_{dc}^{**}$ obtained by adding the voltage command $v_{dc}^*$ to the harmonic voltage $\Delta v_{dc}^*$ and a value $v_{qc}^{**}$ obtained by adding the voltage command $v_{qc}^*$ to the harmonic voltage $\Delta v_{qc}$.

Next, a description will be given of a principle of a harmonic superposition method. First, a description will be given of basic operations of voltage control and phase control by vector control.

According to the basic operation of the voltage control, the vector control arithmetic unit 11 calculates a proportional-integral (PI) control output $\Delta v_{dc\_pi}$ for d-axis current control, an integral (I) control output $\Delta v_{dc\_i}$ for d-axis current control, a PI control output $\Delta v_{qc\_pi}$ for q-axis current control, and an I control output $\Delta v_{qc\_i}$ for q-axis current control, based on the deviation between the second current command $i_d^{**}$ on the d-axis and the average value $i_{dc\_ver}$ and the deviation between the current command $i_q^*$ on the q-axis and the average value $i_{qc\_ver}$.

The vector control arithmetic unit 11 also calculates voltage commands $v_{dc}^*$ and $v_{qc}^*$ in accordance with Equation (1), using a PI control output $\Delta v_{dc\_pi}$ for d-axis current control, an I control output $\Delta v_{dc\_i}$ for d-axis current control, a PI control output $\Delta v_{qc\_pi}$ for q-axis current control, and an I control output $\Delta v_{qc\_i}$ for q-axis current control, as outputs for dc-axis current control and outputs for qc-axis current control, the speed estimated value $\hat{\omega}_{rc}$, and the electric constants (R, $L_d$, $L_q$, $K_e$) of the magnet motor 1.

[Formula 1]

$$\left. \begin{aligned} v_{dc}^* &= -\hat{\omega}_{rc} \cdot \frac{L_q^*}{R_*} \cdot \Delta v_{qc\_i} + \Delta v_{dc\_pi} \\ v_{qc}^* &= \hat{\omega}_{rc} \cdot \frac{L_d^*}{R_*} \cdot \Delta v_{dc\_i} + \hat{\omega}_{rc} \cdot K_e^* + \Delta v_{qc\_pi} \end{aligned} \right\} \quad (1)$$

The symbols in Equation (1) are defined as follows.
R: Resistance value of entire magnet motor.
$L_d$: d-Axis inductance value.
$L_q$: q-Axis inductance value.
$K_e$: Induced voltage coefficient.
*: Set value.
$\Delta v_{dc\_pi}$: PI Control output for d-axis current control.
$\Delta v_{dc\_i}$: I Control output for d-axis current control.
$\Delta v_{qc\_pi}$: PI Control output for q-axis current control.
$\Delta v_{qc\_i}$: I Control output for q-axis current control.

The harmonic voltage generation unit 12 outputs rectangular wave or sine wave harmonic voltages $\Delta v_{dc}^*$ and $\Delta v_{qc}^*$ each having an amplitude value $V_h$ and a frequency $f_h$. The harmonic voltage generation unit 12 then calculates a value $v_{dc}^{**}$ by adding the harmonic voltage $\Delta v_{dc}^*$ to the voltage command $v_{dc}^*$, and also calculates a value $v_{qc}^{**}$ by adding the harmonic voltage $\Delta v_{qc}^*$ to the voltage command $v_{qc}^*$, in accordance with Equation (2). The harmonic voltage generation unit 12 thus controls the three-phase voltage commands $v_u^*$, $v_v^*$, and $v_v^*$ for controlling the power converter 2.

[Formula 2]

$$\left. \begin{array}{l} v_{dc}^{**} = v_{dc}^* + \Delta v_{dc}^* \\ v_{qc}^{**} = v_{qc}^* + \Delta v_{qc}^* \end{array} \right\} \quad (2)$$

On the other hand, the basic operation of the phase control may be any method as long as the phase error estimation unit 6 is capable of estimating a magnetic pole position. An example of such a method is described in a cited reference "Initial Rotor Position Estimation of Interior Permanent Magnet Synchronous Motor", the transactions of the Institute of Electrical Engineers of Japan, D (publication of Industry Applications Society), vol. 123(2), pp. 140-148 (2003).

The harmonic voltage generation unit 12 respectively superposes the rectangular wave or sine wave harmonic voltages $\Delta v_{dc}^*$ and $\Delta v_{qc}^*$ each having the amplitude value $V_h$ and the frequency $f_h$ on the dc-axis and the qc-axis. The phase error estimation unit 6 calculates the phase error estimated value $\Delta \theta_c$ in accordance with Equation (3).

[Formula 3]

$$\Delta \theta_c = \frac{1}{2} \tan^{-1} \left[ \frac{2\{(Ld+Lq)Vv_{dc}^* Vv_{qc}^* - Ld \cdot Lq(Vv_{qc}^* Vi_{dc} + Vv_{dc}^* Vi_{qc})\}}{2 \cdot Ld \cdot Lq(Vv_{dc}^* Vi_{dc} - Vv_{qc}^* Vi_{qc}) - (Ld+Lq)(Vv_{dc}^{*2} - Vv_{qc}^{*2})} \right] \quad (3)$$

The symbols in Equation (3) are defined as follows.
$L_d$: d-Axis inductance value.
$L_q$: q-Axis inductance value.
$Vv_{dc}^*$: Harmonic voltage command superposed on dc-axis.
$Vv_{qc}^*$: Harmonic voltage command superposed on qc-axis.
$V_{idc}$: Harmonic current on dc-axis.
$V_{iqc}$: Harmonic current on qc-axis.

The position and speed estimation unit 7 controls the speed estimated value $\omega_{rc}\hat{}$ and the position estimated value $\theta_{dc}$ by an arithmetic operation expressed by Equation (4) such that the phase error estimated value $\Delta \theta_c$ becomes "zero".

[Formula 4]

$$\left. \begin{array}{l} \hat{\omega_{rc}} = 0 - \Delta \theta_c \cdot \left( K_p + \frac{K_i}{s} \right) \\ \theta dc = \frac{1}{s} \cdot \hat{\omega_{rc}} \end{array} \right\} \quad (4)$$

The symbols in Equation (4) are defined as follows.
$K_p$: Proportional gain.
$K_i$: Integral gain.
s: Laplacian operator.

Figure 2:
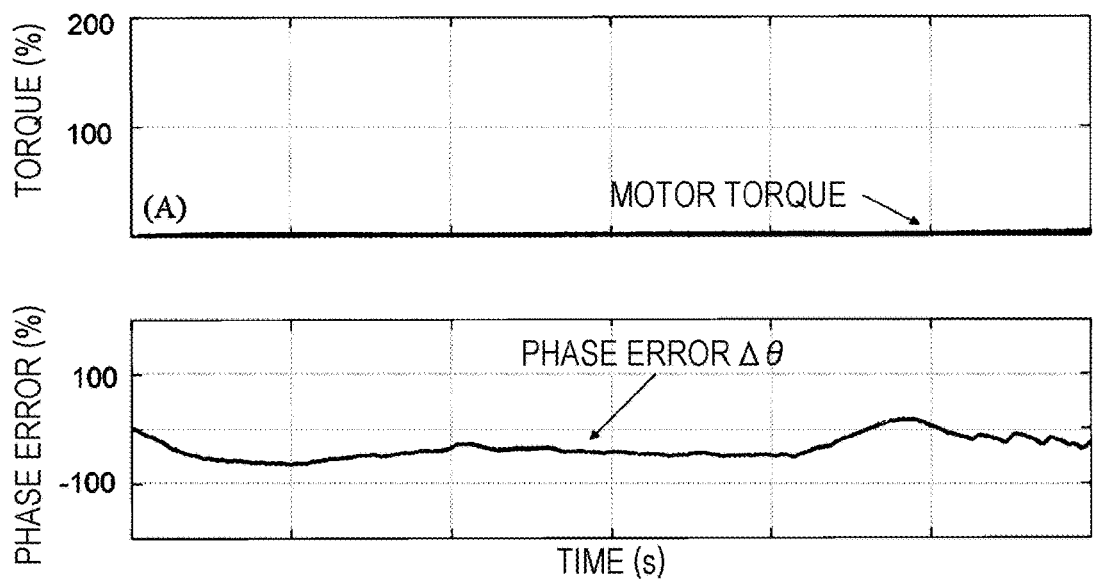
FIG. 2 illustrates characteristics of a torque and a phase error in a comparative example.

Next, a description will be given of control characteristics in a case where the magnet motor 1 has a saliency ratio approximate to 1, and the power conversion apparatus does not include the saliency ratio estimation unit 8 and the saliency ratio control unit 9. FIG. 2 illustrates characteristics of a torque and a phase error in a comparative example on condition that the magnet motor 1 is operated under a load.

In FIG. 2, the upper side illustrates the relationship between a torque and a time, and the lower side illustrates the relationship between a phase error and a time. A ramp-wise load torque $T_L$ is applied to the magnet motor 1 from a point in time (A). As illustrated in the lower side of FIG. 2, the phase error $\Delta \theta$ is lowered by −50 degrees from the state of no load. The magnet motor 1 becomes unstable because of the phase error.

At this time, the power conversion apparatus may reach its overcurrent level to be set based on, for example, a withstand current (maximum current) of the semiconductor switching element in the power converter 2. As a result, the power conversion apparatus fails to drive the magnet motor 1. As described above, the case where the saliency ratio of the magnet motor 1 is approximate to 1 causes a problem in that overcurrent is apt to flow through the power conversion apparatus, which puts the power conversion apparatus out of action.

The use of the current detection arithmetic unit 5, saliency ratio estimation unit 8, and saliency ratio control unit 9, which are the features of Embodiment 1, solves this problem.

Figure 3:
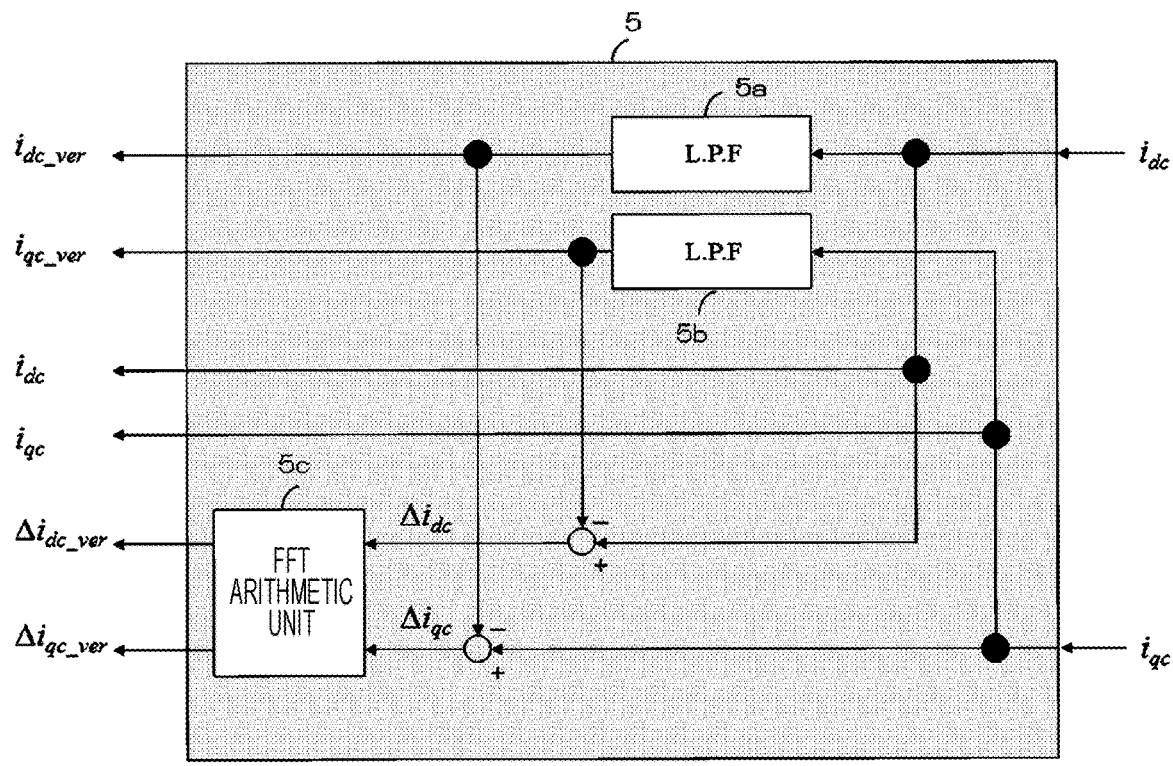
FIG. 3 illustrates a configuration of a current detection arithmetic unit in Embodiment 1.

Next, a description will be given of control characteristics in the case of using these units. FIG. 3 illustrates a configuration of the current detection arithmetic unit 5.

The current detection arithmetic unit 5 includes a low pass filter 5a and a low pass filter 5b. The low pass filter 5a removes the harmonic current contained in the current detected value $i_{dc}$, and outputs the average value $i_{dc\_ver}$ of the current detected value. The low pass filter 5b removes the harmonic current contained in the current detected value $i_{qc}$, and outputs the average value $i_{qc\_ver}$ of the current detected value.

The current detection arithmetic unit 5 calculates the harmonic currents $\Delta i_{dc}$ and $\Delta i_{qc}$ in accordance with Equation (5), using the current detected values $i_{dc}$ and $i_{qc}$ and the average values $i_{dc\_ver}$ and $i_{qc\_ver}$ of the current detected values.

[Formula 5]

$$\left. \begin{array}{l} \Delta i_{dc} = i_{dc} - i_{dc\_ver} \\ \Delta i_{qc} = i_{qc} - i_{qc\_ver} \end{array} \right\} \quad (5)$$

The current detection arithmetic unit 5 also includes a fast-Fourier-transform (FFT) arithmetic unit 5c. The FFT arithmetic unit 5c outputs the amplitude values $\Delta i_{dc\_ver}$ and $\Delta i_{qc\_ver}$ of the harmonic currents $\Delta i_{dc}$ and $\Delta i_{qc}$ contained in the current detected values $i_{dc}$ and $i_{qc}$.

Figure 4:
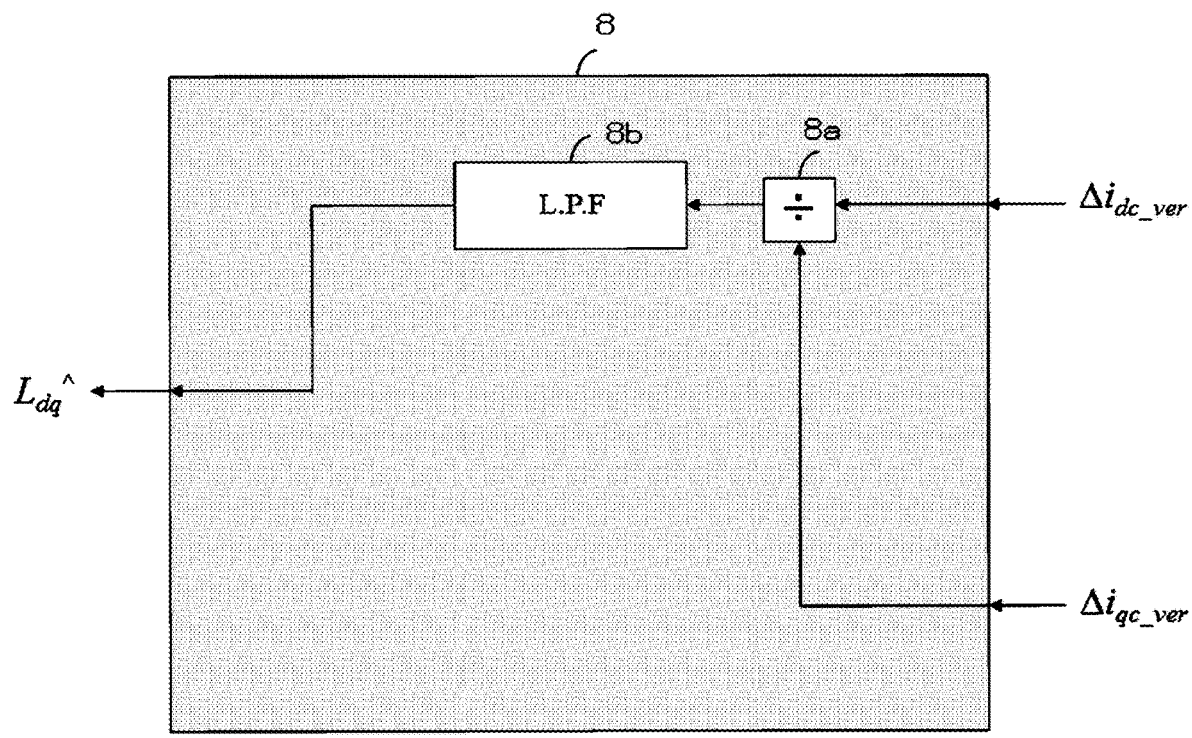
FIG. 4 illustrates a configuration of a saliency ratio estimation unit in Embodiment 1.

FIG. 4 illustrates a configuration of the saliency ratio estimation unit 8. The saliency ratio estimation unit 8 includes a division unit 8a. The division unit 8a outputs a ratio between the amplitude value $\Delta i_{qc\_ver}$ of the harmonic current and the amplitude value $\Delta i_{dc\_ver}$ of the harmonic current. The saliency ratio estimation unit 8 also includes a low pass filter 8b. The low pass filter 8b removes the harmonic component contained in the output from the division unit 8a, and outputs the saliency ratio estimated value $L_{dq}\hat{}$.

Figure 5:
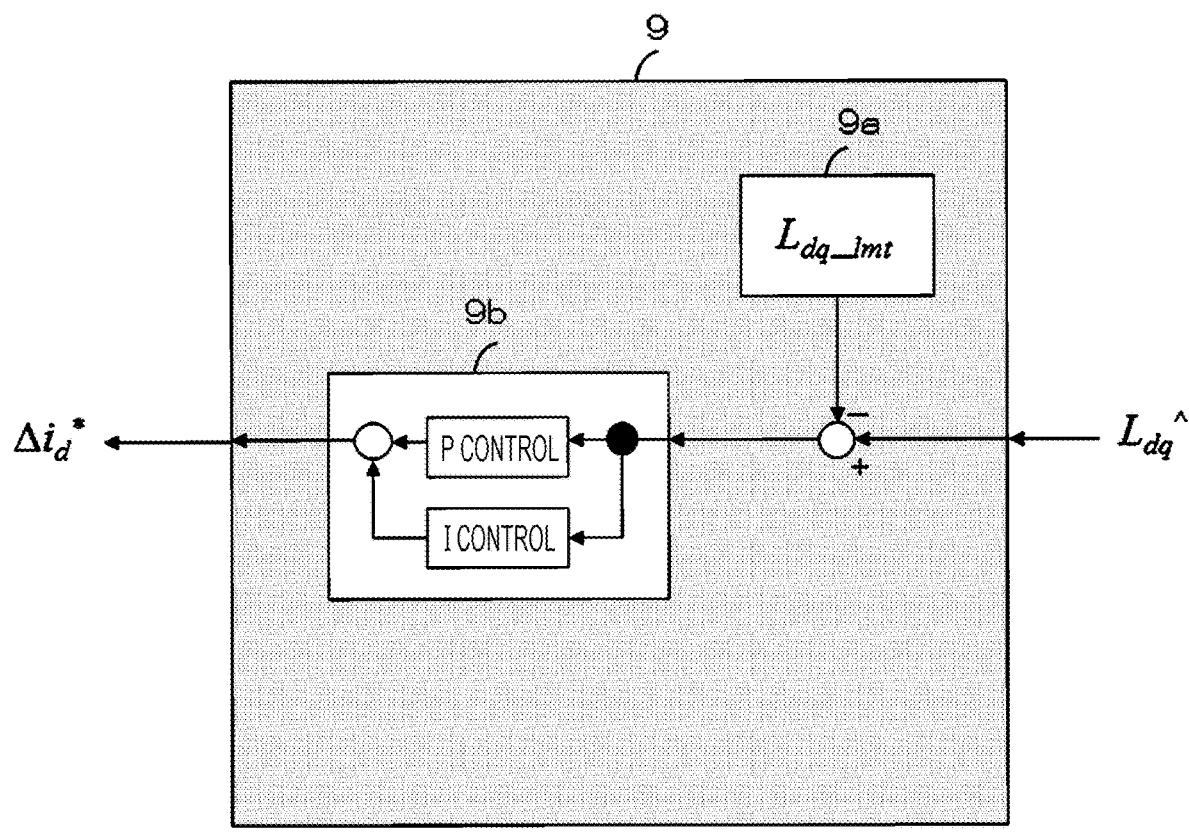
FIG. 5 illustrates a configuration of a saliency ratio control unit in Embodiment 1.

FIG. 5 illustrates a configuration of the saliency ratio control unit 9. The saliency ratio control unit 9 holds a predetermined saliency ratio 9a to be set, that is, a saliency ratio $L_{dq\_lmt}$. The saliency ratio control unit 9 includes a PI control unit 9b. The PI control unit 9b receives a deviation ($L_{dq}\hat{}-L_{dq\_lmt}$) between the predetermined saliency ratio $L_{dq\_lmt}$ and the saliency ratio estimated value $L_{dq}\hat{}$. The PI control unit 9b then calculates and outputs the corrected value $\Delta i_d^*$ of the direct-current component on the d-axis such that the deviation becomes zero. The saliency ratio control unit 9 increases or decreases the d-axis current command $i_d^*$ to indirectly control the d-axis inductance. The saliency ratio control unit 9 thus increases the saliency ratio in excess of 1.0.

Figure 6:
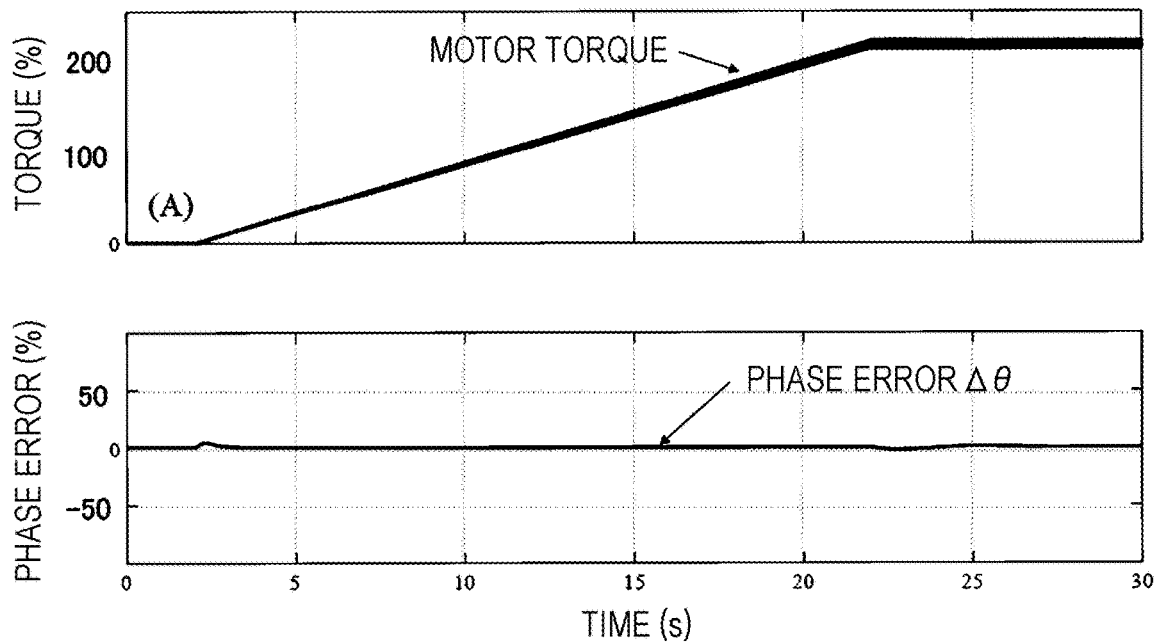
FIG. 6 illustrates characteristics of a torque and a phase error in Embodiment 1.

FIG. 6 illustrates characteristics of a torque and a phase error in Embodiment 1. The saliency ratio $L_{dq\_lmt}$ is set at 1.5 under the same condition as that illustrated in FIG. 2. As is obvious from a comparison between the torque-phase error characteristics illustrated in FIG. 2 and those illustrated in FIG. 6, controlling the saliency ratio of the magnet motor 1 effectively enables stable position sensorless control even at a high torque of 200%.

Figure 7:
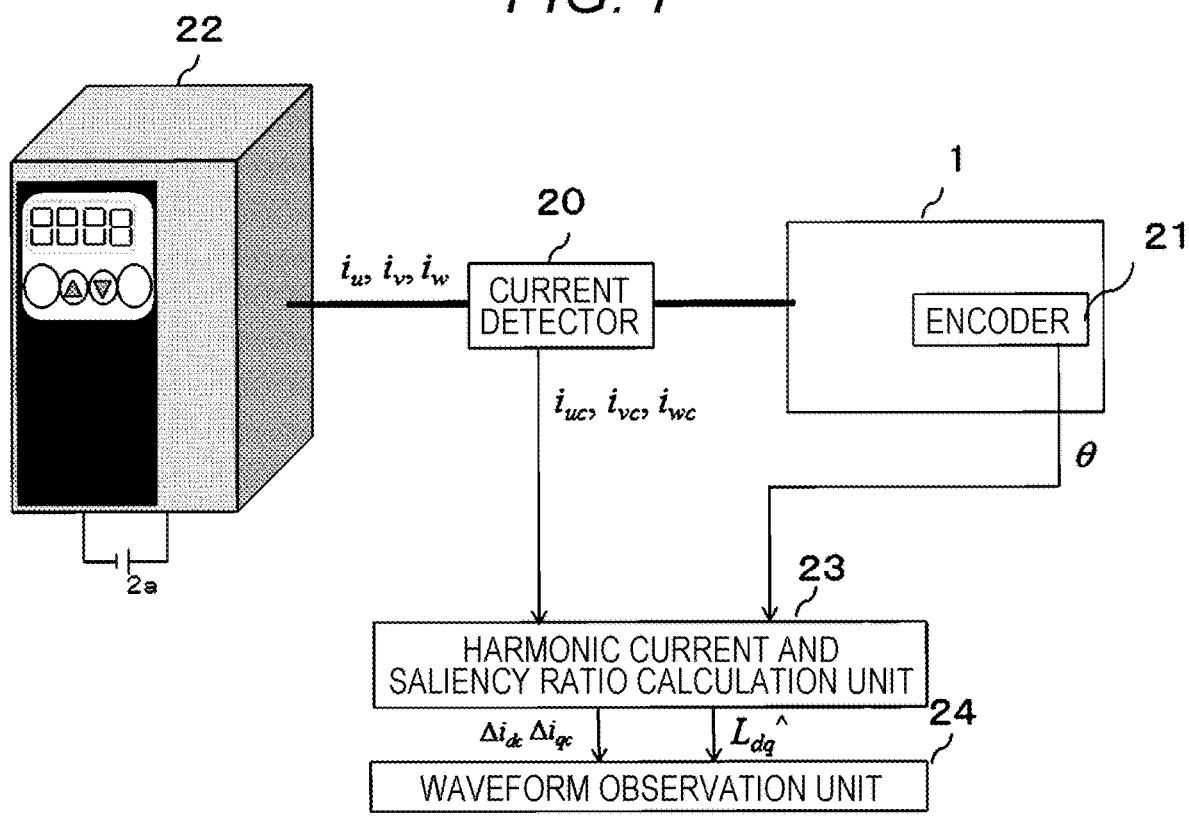
FIG. 7 illustrates a verification method adopting Embodiment 1.

FIG. 7 illustrates a verification method adopting Embodiment 1. A current detector 20 is attached to the power conversion apparatus 22 for driving the magnet motor 1, and an encoder 21 is attached to the shaft of the magnet motor 1.

A harmonic current and saliency ratio calculation unit 23 receives three-phase alternating-current detected values ($i_{uc}$, $i_{vc}$, $i_{wc}$) from the current detector 20, and also receives a position θ from the encoder 21. The harmonic current and saliency ratio calculation unit 23 performs arithmetic operations similar to those of the current detection arithmetic unit 5 and saliency ratio estimation unit 8. The harmonic current and saliency ratio calculation unit 23 thus outputs harmonic currents $\Delta i_{dc}$ and $\Delta i_{qc}$ or harmonic current amplitude values $\Delta i_{dc\_ver}$ and $\Delta i_{qc\_ver}$, and also outputs a saliency ratio estimated value $L_{dq}\hat{}$.

A waveform observation unit 24 observes the relationship between the harmonic currents $\Delta i_{dc}$ and $\Delta i_{qc}$ and the saliency ratio estimated value $L_{dq}\hat{}$ or the relationship between the harmonic current amplitude values $\Delta i_{dc\_ver}$ and $\Delta i_{qc\_ver}$ and the saliency ratio estimated value $L_{dq}\hat{}$. It is obvious that the present invention is adopted when the saliency ratio estimated value $L_{dq}\hat{}$ is constant. In a case where the encoder 21 cannot be attached to the magnet motor 1, the saliency ratio may be estimated using a current ripple in a case where the three-phase alternating-current detected values ($i_{uc}$, $i_{vc}$, $i_{wc}$) are approximate to zero rather than the harmonic current $\Delta i_{dc}$, an amplitude value of the current ripple rather than the harmonic current amplitude value $\Delta i_{dc\_ver}$, a current ripple in a case where each current detected value is approximate to its maximum value rather than the harmonic current $\Delta i_{qc}$, and an amplitude value of the current ripple rather than the harmonic current amplitude value $\Delta i_{qc\_ver}$.

The power conversion apparatus according to Embodiment 1 adjusts the current command value on the d-axis and the current command value on the q-axis independently of each other to increase the saliency ratio of the magnet motor 1. The power conversion apparatus according to Embodiment 1 therefore stabilizes sensorless control to output a higher torque. In other words, the power conversion apparatus according to Embodiment 1 enables stable position sensorless control even at a higher torque. In addition to the IPM motor, the power conversion apparatus according to Embodiment 1 also stably drives an SPM motor having a saliency ratio which is approximately 1, within an enlarged operating range.

Embodiment 2

Figure 8:
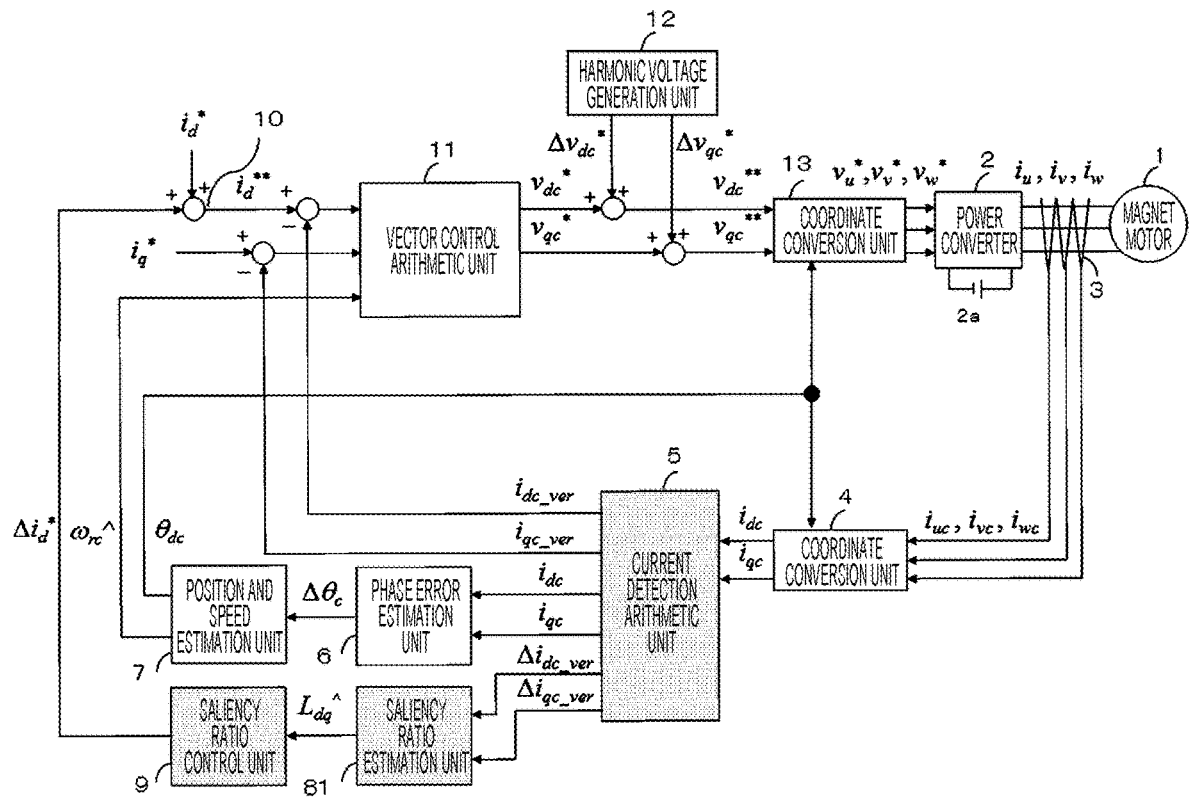
FIG. 8 illustrates a configuration of a system including a power conversion apparatus and a magnet motor in Embodiment 2.

FIG. 8 illustrates a configuration of a system including a power conversion apparatus and a magnet motor in Embodiment 2.

According to Embodiment 1, a saliency ratio estimated value is calculated from a harmonic current amplitude value. According to Embodiment 2, inductances $L_d\hat{}$ and $L_q\hat{}$ are calculated from a harmonic current amplitude value, and a saliency ratio estimated value $L_{dq}\hat{}$ is then calculated from a ratio between the inductances $L_d\hat{}$ and $L_q\hat{}$.

The configuration illustrated in FIG. 8 is similar to that illustrated in FIG. 1 except a saliency ratio estimation unit 81; therefore, the description thereof will not be given here.

Figure 9:
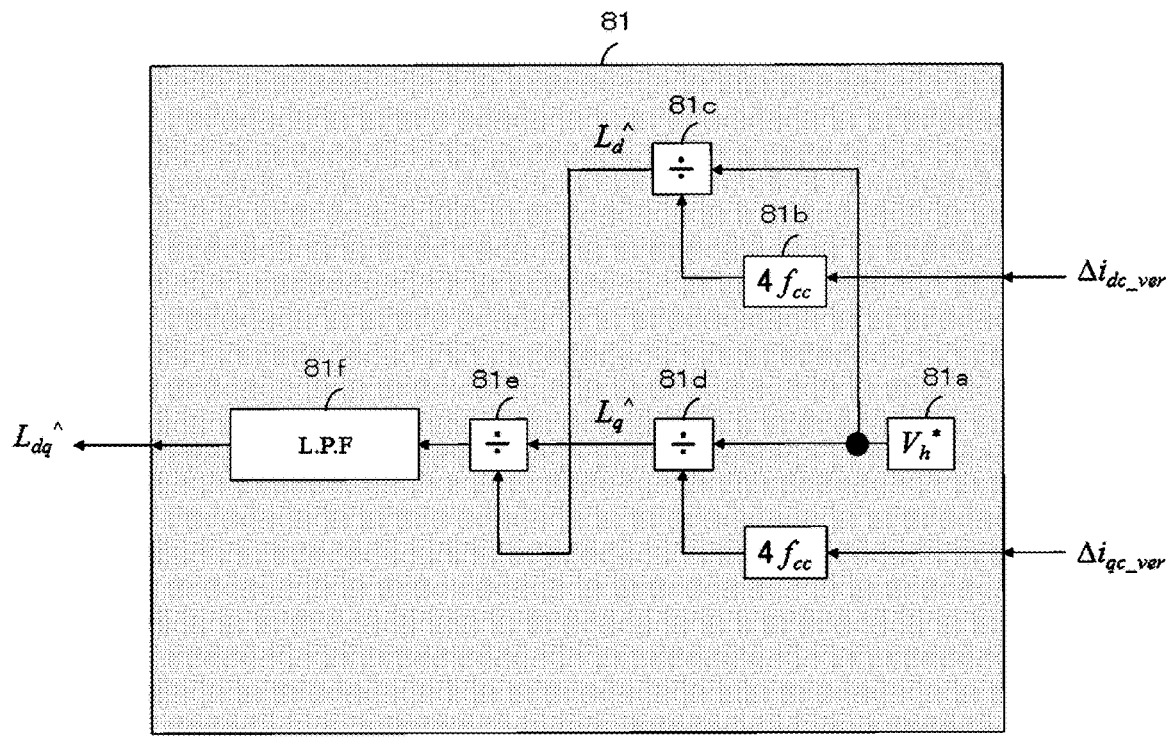
FIG. 9 illustrates a configuration of a saliency ratio estimation unit in Embodiment 2.

FIG. 9 illustrates a configuration of the saliency ratio estimation unit 81 in Embodiment 2.

The saliency ratio estimation unit 81 holds a constant 81a which is a harmonic voltage amplitude value $V_h^*$ and a constant 81b which is a harmonic frequency $f_{cc}$. The saliency ratio estimation unit 81 includes a division unit 81c, a division unit 81e, and a low pass filter 81f. The saliency ratio estimation unit 81 calculates an estimated value of an inductance $L_d\hat{}$ on a d-axis and an estimated value of an inductance $L_q\hat{}$ on a q-axis in accordance with Equation (6).

[Formula 6]

$$\left. \begin{array}{l} L_d\hat{} = \frac{1}{2} \cdot \frac{V_h^*}{2 \cdot f_{cc}} \cdot \frac{1}{\Delta i_{dc\_ver}} \\ L_q\hat{} = \frac{1}{2} \cdot \frac{V_h^*}{2 \cdot f_{cc}} \cdot \frac{1}{\Delta i_{qc\_ver}} \end{array} \right\} \quad (6)$$

In Embodiment 2, the harmonic voltage amplitude value $V_h^*$ is equal to the amplitude value of the harmonic voltage $\Delta v_{dc}^*$ on the dc-axis and the amplitude value of the harmonic voltage $\Delta v_{qc}^*$ on the qc-axis in FIG. 1. The saliency ratio estimation unit 81 also calculates a saliency ratio estimated value $L_{dq}\hat{}$ in accordance with Equation (7).

[Formula 7]

$$L_{dq}\hat{} = L_q\hat{}/L_d\hat{} \quad (7)$$

This configuration has a merit of reflecting the inductance $L_d\bar{}$ on the d-axis and the inductance $L_q\bar{}$ on the q-axis, each of which is calculated by the arithmetic operation, on Equation (3) as the phase error estimation arithmetic formula.

Embodiment 3

Figure 10:
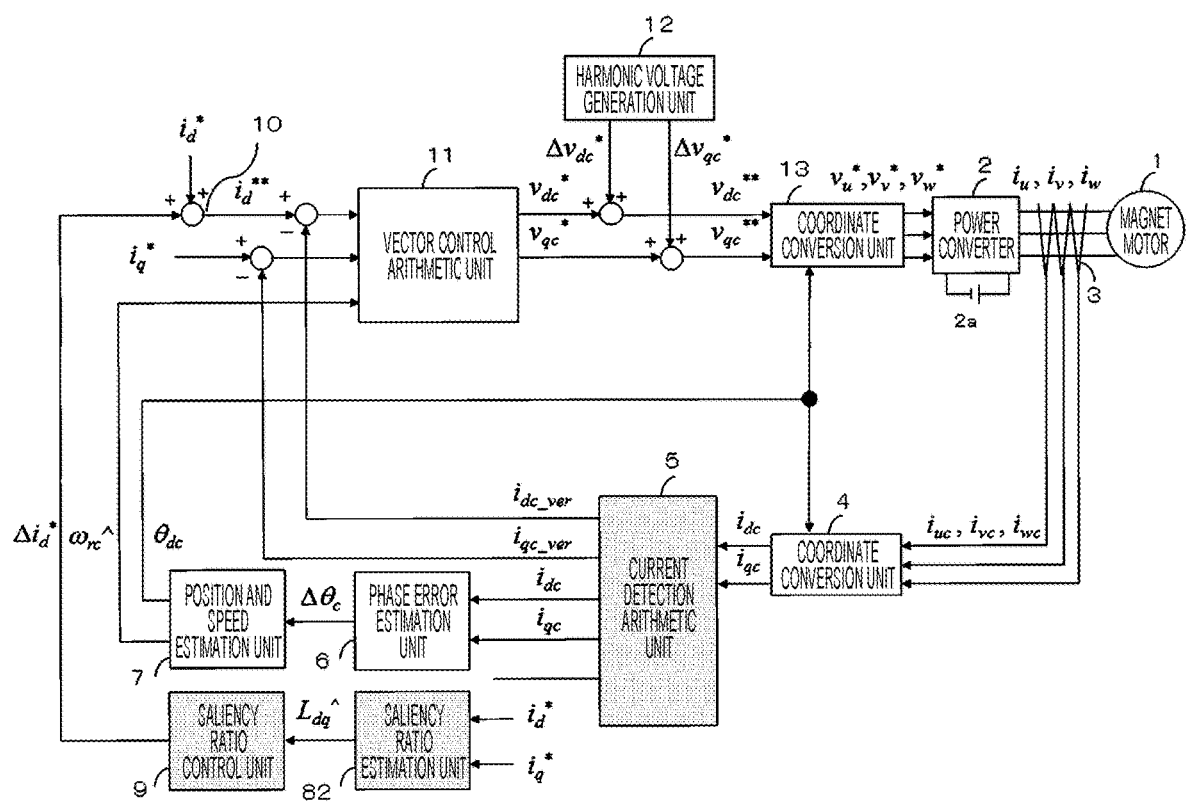
FIG. 10 illustrates a configuration of a system including a power conversion apparatus and a magnet motor in Embodiment 3.

FIG. 10 illustrates a configuration of a system including a power conversion apparatus and a magnet motor in Embodiment 3. According to Embodiment 1, a saliency ratio estimated value is calculated from a harmonic current amplitude value. According to Embodiment 3, an inductance $L_d^\frown$ on a d-axis and an inductance $L_q^\frown$ on a q-axis are called up by table reference. The configuration illustrated in FIG. 10 is similar to that illustrated in FIG. 1 except a saliency ratio estimation unit 82; therefore, the description thereof will not be given here.

Figure 11:
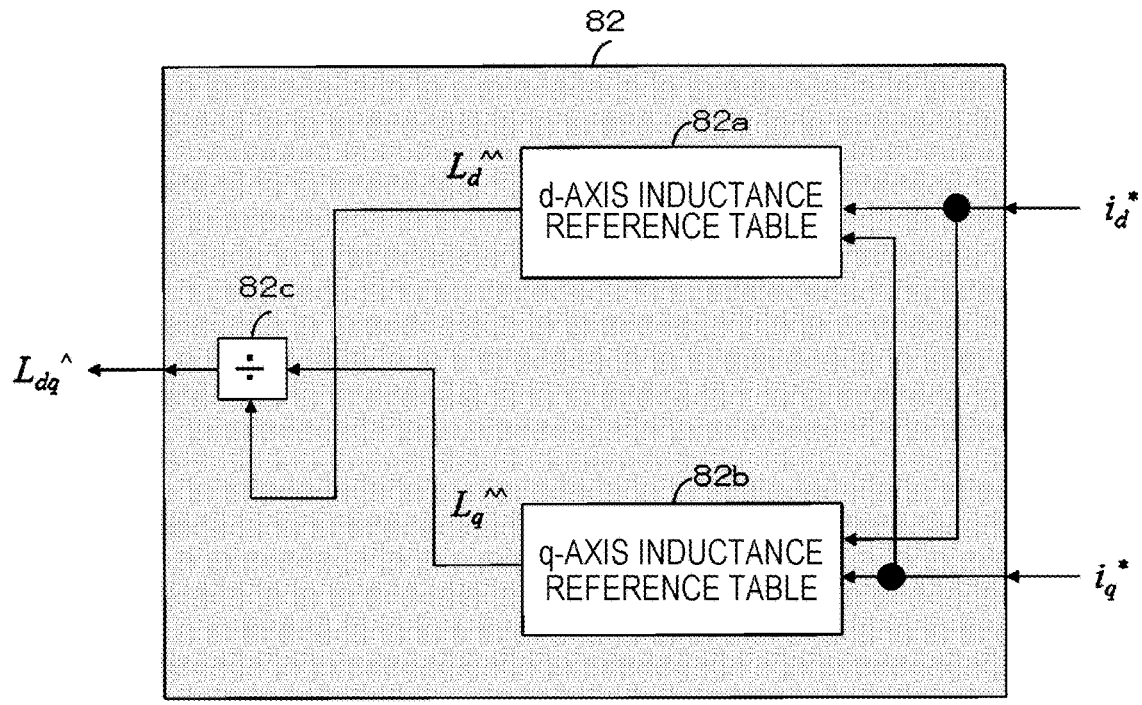
FIG. 11 illustrates a configuration of a saliency ratio estimation unit 82 in Embodiment 3.

FIG. 11 illustrates the saliency ratio estimation unit 82 in Embodiment 3.

The saliency ratio estimation unit 82 includes a d-axis inductance reference table 82a and a q-axis inductance reference table 82b. The d-axis inductance reference table 82a receives a current command $i_d^*$ on the d-axis and a current command $i_q^*$ on the q-axis, and outputs an inductance $L_d^\frown$ on the d-axis. The q-axis inductance reference table 82b receives a current command $i_d^*$ on the d-axis and the current command $i_q^*$ on the q-axis, and outputs an inductance $L_q^\frown$ on the q-axis.

In Embodiment 3, the d-axis inductance reference table 82a holds the inductance $L_d^\frown$ on the d-axis corresponding to the current command $i_d^*$ on the d-axis. The q-axis inductance reference table 82b holds the inductance $L_q^\frown$ on the q-axis corresponding to the current command $i_q^*$ on the q-axis.

The d-axis inductance reference table 82a and the q-axis inductance reference table 82b may be prepared in offline auto-tuning to be executed upon start-up of a general-purpose inverter. Alternatively, data in each table may be learned during the operation by the method according to Embodiment 1 or 2, and the operation may be switched to the operation by the method according to Embodiment 3 after completion of the learning.

According to Embodiment 3, the inductance on the d-axis is calculated from the current command $i_d^*$ on the d-axis, and the inductance on the q-axis is calculated from the current command $i_q^*$ on the q-axis. Alternatively, a saliency ratio estimated value $L_{dq}^\frown$ corresponding to the current command $i_d^*$ on the d-axis and the current command $i_q^*$ on the q-axis may be obtained in advance by offline auto-tuning or learning during the operation. In other words, the saliency ratio estimated value $L_{dq}^\frown$ corresponding to the current command $i_d^*$ on the d-axis and the current command $i_q^*$ on the q-axis may be acquired based on a saliency ratio reference table holding the saliency ratio estimated value $L_{dq}^\frown$, the current command $i_d^*$ on the d-axis, and the current command $i_q^*$ on the q-axis.

This configuration produces advantageous effects similar to those described in Embodiment 1 although the method according to Embodiment 3 is implemented in an offline environment.

Embodiment 4

Figure 12:
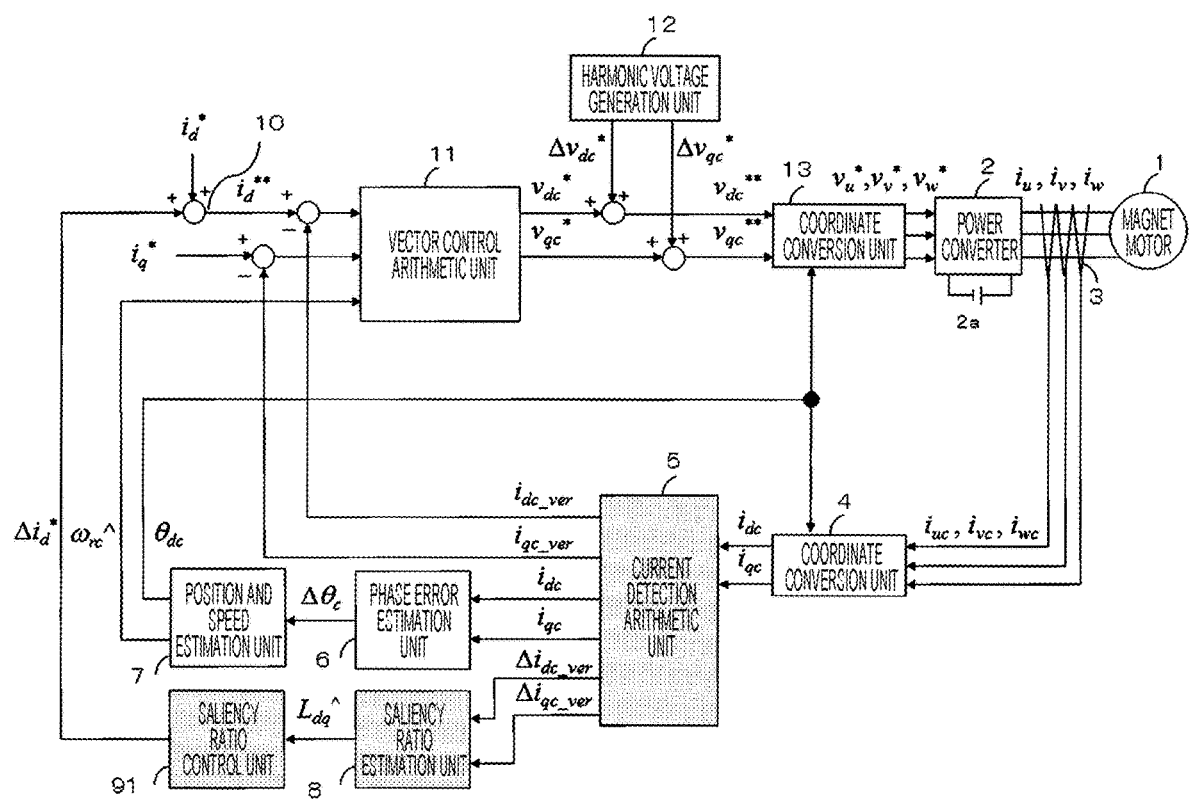
FIG. 12 illustrates a configuration of a system including a power conversion apparatus and a magnet motor in Embodiment 4.

FIG. 12 illustrates a configuration of a system including a power conversion apparatus and a magnet motor in Embodiment 4. According to Embodiment 1, a current command on the d-axis is increased or decreased such that a saliency ratio estimated value follows a predetermined saliency ratio. According to Embodiment 4, a current command on a d-axis is increased when a saliency ratio estimated value $L_{dq}^\frown$ is lower than a predetermined saliency ratio $L_{dq\_lmt}$.

The configuration illustrated in FIG. 12 is similar to that illustrated in FIG. 1 except a saliency ratio control unit 91; therefore, the description thereof will not be given here.

Figure 13:
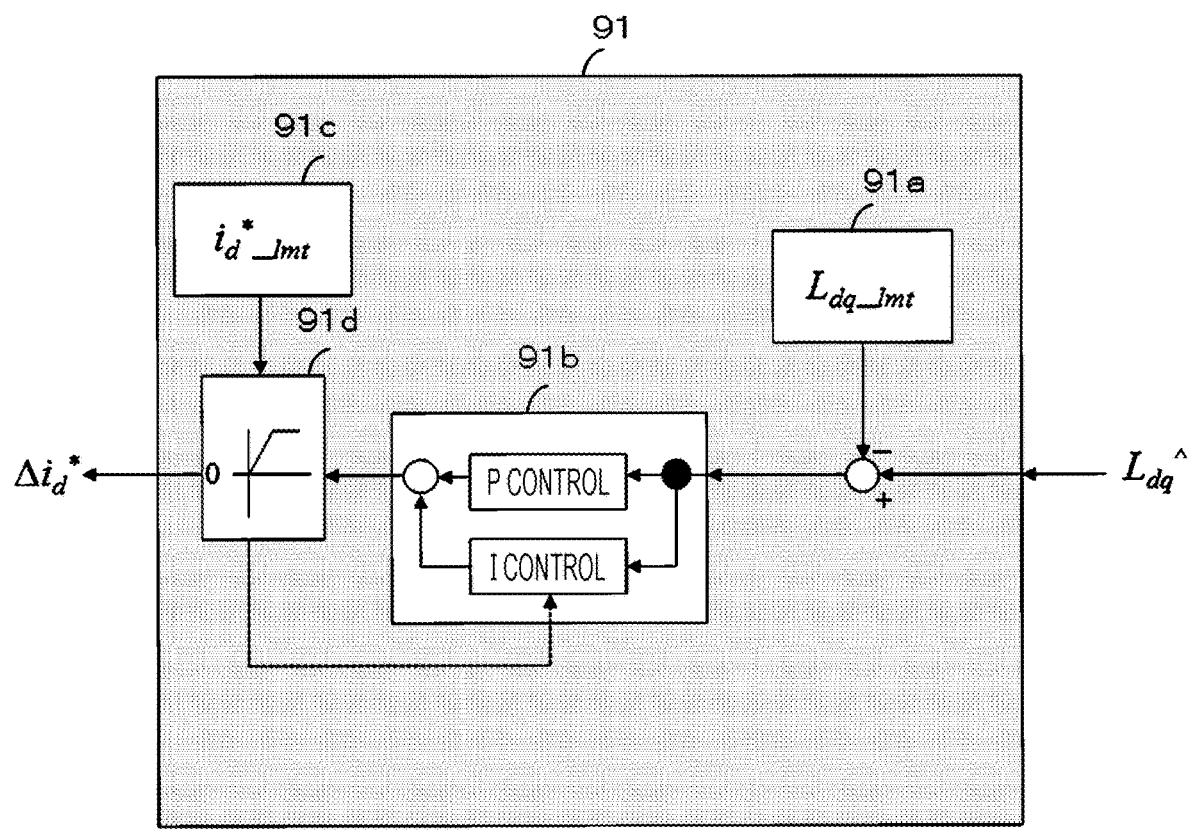
FIG. 13 illustrates a configuration of a saliency ratio control unit 91 in Embodiment 4.

FIG. 13 illustrates a configuration of the saliency ratio control unit 91 in Embodiment 4.

The saliency ratio control unit 91 holds a predetermined saliency ratio 91a to be set, that is, a saliency ratio $L_{dq\_lmt}$. The saliency ratio control unit 91 includes a proportional-integral (PI) control unit 91b. The PI control unit 91b calculates and outputs a corrected value $\Delta i_d^*$ of a current command on the d-axis such that a deviation between a saliency ratio estimated value $L_{dq}^\frown$ and the saliency ratio $L_{dq\_lmt}$ becomes zero.

The saliency ratio control unit 91 also holds a predetermined limit value 91c to be set, that is, a limit value $i_{d\_lmt}^*$ of a direct-current component on the d-axis. The saliency ratio control unit 91 also includes a d-axis current command limit unit 91d. The d-axis current command limit unit 91d limits the corrected value $\Delta i_d^*$ of the current command on the d-axis. The d-axis current command limit unit 91d has an upper limit value of $i_{d\_lmt}^*$ and a lower limit value of 0. The d-axis current command limit unit 91d receives an output from the PI control unit 91b. As a result, the d-axis current command limit unit 91d outputs the corrected value $\Delta i_d^*$ of the current command on the d-axis, the corrected value $\Delta i_d^*$ taking a positive current value.

The predetermined limit value $i_{d\_lmt}^*$ may be set based on, for example, a withstand current (maximum current) of a semiconductor switching element in a power converter 2.

This configuration does not require a d-axis current more than necessary at a lower torque, and therefore has a merit of improving efficiency.

Embodiment 5

Figure 14:
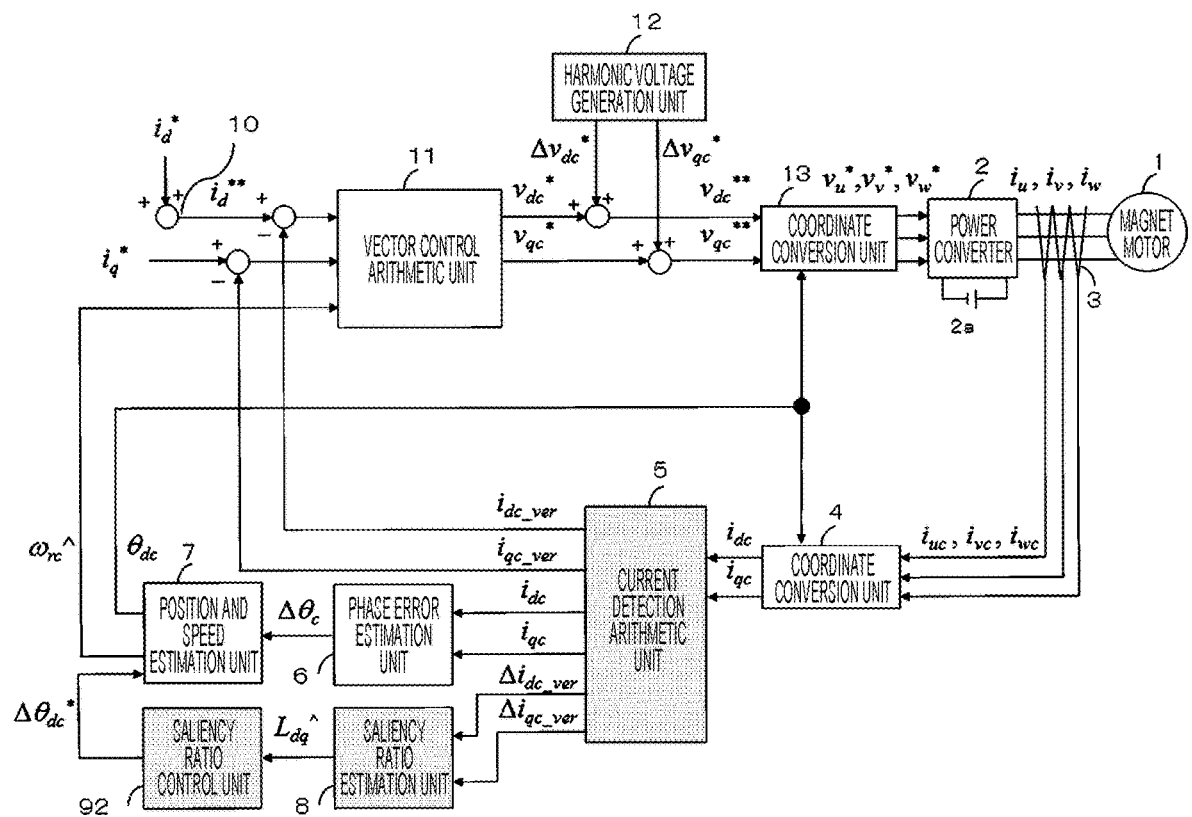
FIG. 14 illustrates a configuration of a system including a power conversion apparatus, a magnet motor, and the like in Embodiment 5.

FIG. 14 illustrates a configuration of a system including a power conversion apparatus, a magnet motor, and the like in Embodiment 5. According to Embodiment 1, a current command on the d-axis is increased or decreased such that a saliency ratio estimated value follows a predetermined saliency ratio. According to Embodiment 5, a phase error command is increased or decreased such that a saliency ratio estimated value follows a predetermined saliency ratio.

The configuration illustrated in FIG. 14 is similar to that illustrated in FIG. 1 except a saliency ratio control unit 92 and a position and speed estimation unit 7; therefore, the description thereof will not be given here.

Figure 15:
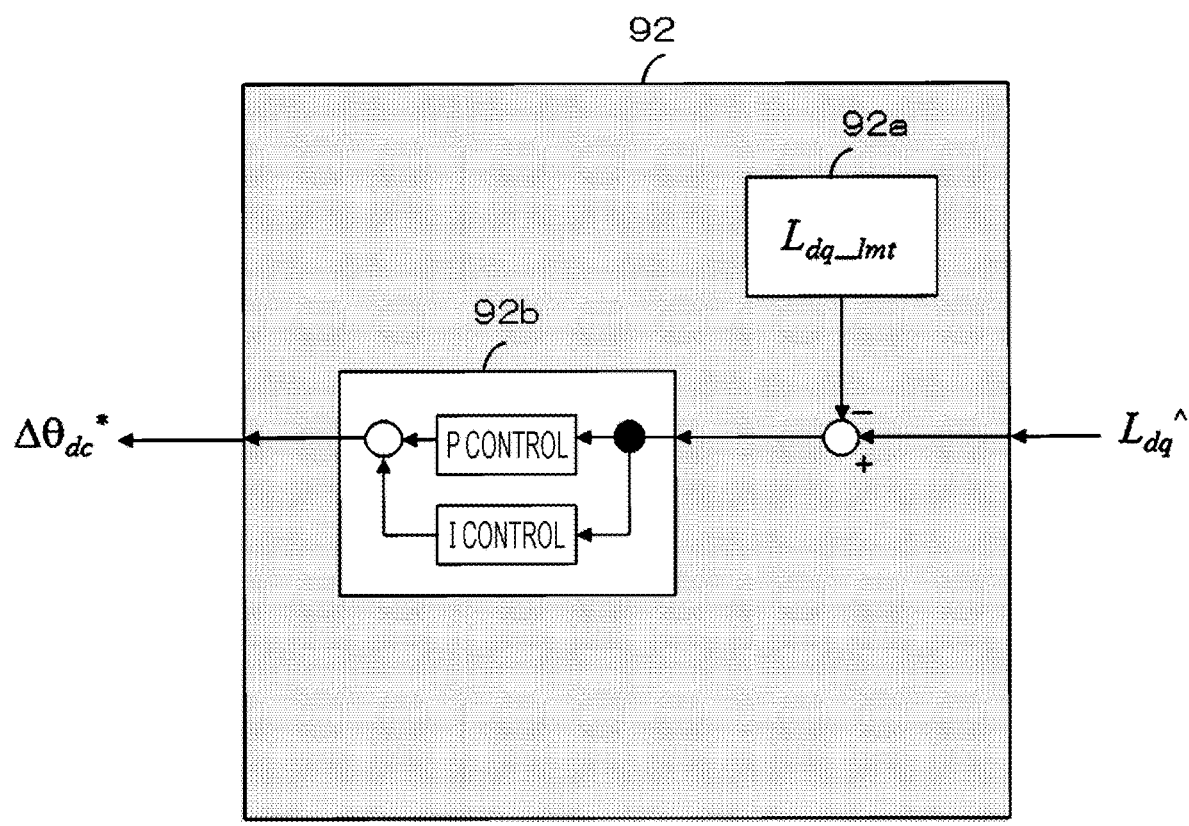
FIG. 15 illustrates a configuration of a saliency ratio control unit 92 in Embodiment 5.

FIG. 15 illustrates a configuration of the saliency ratio control unit 92 in Embodiment 5.

The saliency ratio control unit 92 holds a predetermined saliency ratio 92a to be set, that is, a saliency ratio $L_{dq\_lmt}$. The saliency ratio control unit 92 includes a proportional-integral (PI) control unit 92b. The PI control unit 92b calculates and outputs a phase error command value $\Delta \theta_{dc}^*$ in accordance with Equation (8) such that a deviation between a saliency ratio estimated value $L_{dq}^\frown$ and the saliency ratio $L_{dq\_lmt}$ becomes zero.

[Formula 8]

$$\Delta \theta_{dc}^* = \left(K_{p1} + \frac{K_{i1}}{s}\right)(L_{dq}^\wedge - L_{dq\_lmt}) \quad (8)$$

The symbols in Equation (8) are defined as follows.
$K_{p1}$: Proportional gain.
$K_{i1}$: Integral gain.

The position and speed estimation unit 7 outputs a position estimated value $\theta_{dc}$ based on the phase error command value $\Delta \theta_{dc}^*$ so as to eliminate a phase error estimated value $\Delta \theta_c$.

The power conversion apparatus according to Embodiment 5 stably drives even a magnet motor having a smaller saliency ratio in a manner similar to that described in Embodiment 1.

Embodiment 6

Figure 16:
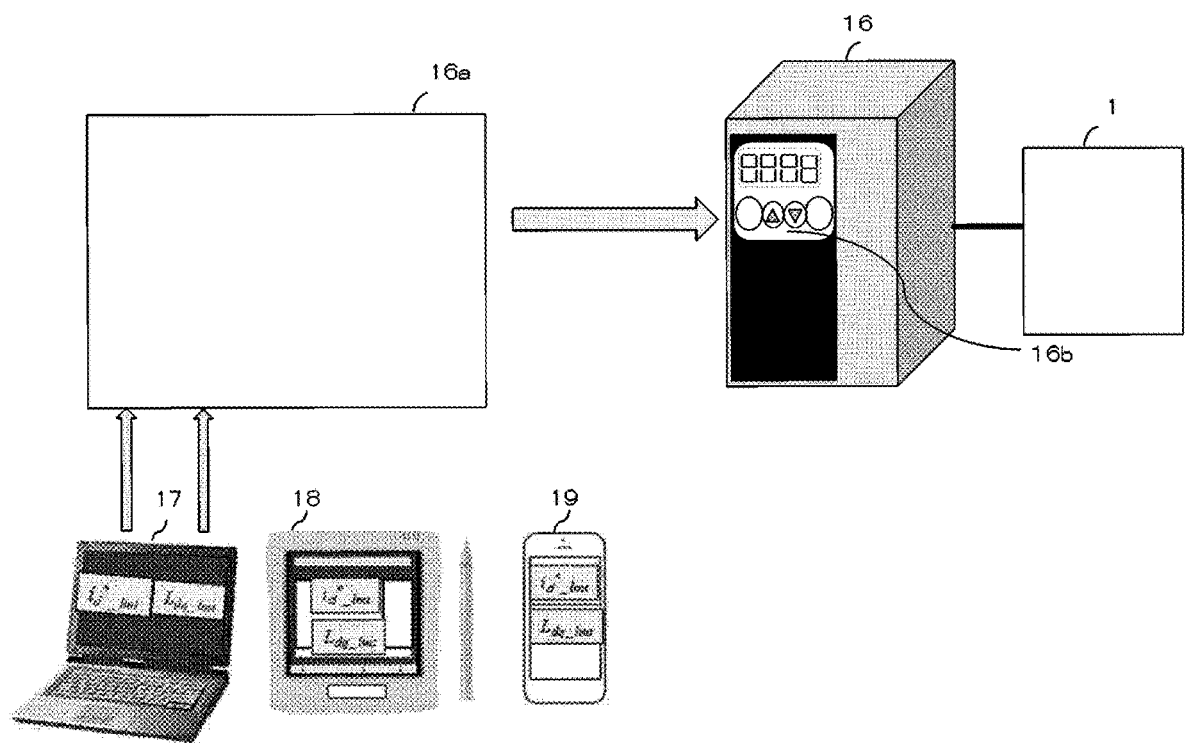
FIG. 16 illustrates a configuration of a system including a power converter and a magnet motor in Embodiment 6.

FIG. 16 illustrates a configuration of a system including a power conversion apparatus and a magnet motor in Embodiment 6. Embodiment 6 is an example applied to a magnet motor drive system.

A magnet motor 1 is driven by a power conversion apparatus 16. The power conversion apparatus 16 includes software 16a and hardware. The software 16a provides various functions to be executed by a processor such as a microcomputer in the power conversion apparatus 16.

The coordinate conversion unit 4, the current detection arithmetic unit 5, the phase error estimation unit 6, the position and speed estimation unit 7, the saliency ratio estimation unit 8, the saliency ratio control unit 9, the addition unit 10, the vector control arithmetic unit 11, the harmonic voltage generation unit 12, and the coordinate conversion unit 13 illustrated in FIG. 1 constitute the software 16a illustrated in FIG. 16.

The power converter 2, the direct-current voltage source 2a, and the current detector 3 illustrated in FIG. 1 are implemented as the hardware. A digital operator 16b in the power conversion apparatus 16 or a host apparatus such as a personal computer 17, a digitizer 18 or a smartphone 19 may set a predetermined saliency ratio $L_{dq\_lmt}$ in the software 16a and a limit value $i_{d\_lmt}^*$ of a direct-current component on a d-axis.

Applying Embodiment 6 to the magnet motor drive system allows even a magnet motor having a smaller saliency ratio to be stably driven. The predetermined saliency ratio $L_{dq\_lmt}$ and the limit value $i_{d\_lmt}^*$ of the direct-current component on the d-axis may be set on a local area network connected to a host apparatus such as a programmable logic controller or a computer.

Embodiments 2 to 5 may be applied in place of Embodiment 1.

According to Embodiments 1 to 5, the arithmetic operation expressed by Equation (1) is performed using the current command values $i_d^{**}$ and $i_q^*$, the current detected values $i_{dc}$ and $i_{qc}$, and the circuit constants of the magnet motor 1. Alternatively, an arithmetic operation expressed by Equation (9) may be performed using the current command values $i_d^{**}$ and $i_q^*$ and the current detected values $i_{dc}$ and $i_{qc}$ to prepare voltage corrected values $\Delta v_{dc}$ and $\Delta v_{qc}$. In addition, an arithmetic operation expressed by Equation (11) may be performed to add the voltage corrected values to a voltage reference value for vector control in Equation (10).

[Formula 9]

$$\Delta v_{dc} = \left(K_{pd} + \frac{K_{id}}{s}\right)(i_d^* - i_{dc}) \\ \Delta v_{qc} = \left(K_{pq} + \frac{K_{iq}}{s}\right)(i_q^* - i_{qc})$$  (9)

The symbols in Equation (9) are defined as follows.
$K_{pd}$: Proportional gain for d-axis current control.
$K_{id}$: Integral gain for d-axis current control.
$K_{pq}$: Proportional gain for q-axis current control.
$K_{iq}$: Integral gain for q-axis current control.
s: Laplacian operator.

[Formula 10]

$$v_{dc0}^* = R^* i_d^{**} - \hat{\omega}_{rc} L_q^* \frac{1}{1 + Tacr s} i_q^* \\ v_{qc0}^* = R^* i_q^* + \hat{\omega}_{rc} L_q^* \frac{1}{1 + Tacr s} i_d^{**} + \hat{\omega}_{rc} K_e^*$$  (10)

The symbols in Equation (10) are defined as follows.
$v_{dc0}^*$: d-Axis voltage command.
$v_{qc0}^*$: q-Axis voltage command.
Tacr: Time constant corresponding to response frequency for current control.
s: Laplacian operator.
$K_e$: Induced voltage coefficient.

[Formula 11]

$$v_{dc}^* = v_{dc0}^* + \Delta v_{dc} \\ v_{qc}^* = v_{qc0}^* + \Delta v_{qc}$$  (11)

In addition, an arithmetic operation expressed by Equation (12) may be performed using the current command values $i_d^*$ and $i_q^*$ and the current detected values $i_{dc}$ and $i_{qc}$ to prepare intermediate current command values $i_d^{}$ and $i_q^{}$ for use in a vector control arithmetic operation. Moreover, an arithmetic operation expressed by Equation (13) may be performed using a speed estimated value $\omega_{rc}^-$ and the circuit constants of the magnet motor 1.

Above Embodiments may also be applicable to a vector control method of performing an arithmetic operation expressed by Equation (14) using a current command $i_d^*$ on the d-axis, a current detected value $i_{qc}$ on the qc-axis, a speed command value $\omega_r^*$, and the circuit constants of the magnet motor 1. Above Embodiments may adopt a vector control method of calculating a voltage command value $V_{dc}^*$ on the dc-axis and a voltage command value $v_{qc}^*$ on the qc-axis.

[Formula 12]

$$\Delta i_d^{**} = \left(K_{pd} + \frac{K_{id}}{s}\right)(i_d^* - i_{dc}) \\ \Delta i_q^{**} = \left(K_{pq} + \frac{K_{iq}}{s}\right)(i_q^* - i_{qc})$$  (12)

The symbols in Equation (12) are defined as follows.
$K_{pd}$: Proportional gain for d-axis current control.
$K_{id}$: Integral gain for d-axis current control.
$K_{pq}$: Proportional gain for q-axis current control.
$K_{iq}$: Integral gain for q-axis current control.
s: Laplacian operator.

[Formula 13]

$$v_{dc}^* = R^* i_d^{**} - \hat{\omega}_{rc} L_q^* \frac{1}{1 + L_q^*/R^* s} i_q^{**} \\ v_{qc}^* = R^* i_q^* + \hat{\omega}_{rc}\left(L_d^* \frac{1}{1 + L_q^*/R^* s} i_d^{**} + K_e^*\right)$$  (13)

-continued

[Formula 14]

$$\left. \begin{array}{l} v_{dc}^* = R^* i_d^* - \omega_r^* L_q^* \dfrac{1}{1+T_d s} i_{qc} \\ v_{qc}^* = R_1^* i_q^* + \omega_r^{**}(L_d^* i_d^* + K_e^*) \end{array} \right\} \quad (14)$$

The symbols in Equation (14) are defined as follows.
$R_1$: Primary resistance of magnet motor.
Td: Delay time constant of current command $i_q^*$ on q-axis.

In Embodiments 1 to 5, the switching element of the power converter 2 may be a Si (silicon) semiconductor element. Alternatively, the switching element may be a SiC (silicon carbide) wide bandgap semiconductor element, a GaN (gallium nitride) wide bandgap semiconductor element or the like.

REFERENCE SIGNS LIST 1 magnet motor
2 power converter
3 current detector
5 current detection arithmetic unit
6 phase error estimation unit
7 position and speed estimation unit
8 saliency ratio estimation unit
9 saliency ratio control unit
11 vector control arithmetic unit

The invention claimed is:

1. A power conversion apparatus for controlling a load apparatus by position sensorless control,
the power conversion apparatus comprising:
a current detection unit configured to detect a current passing through the load apparatus;
a current detection arithmetic unit configured to calculate a harmonic current component on a dc-axis as a control axis and a harmonic current component on a qc-axis, based on the detected current;
a saliency ratio estimation unit configured to output a saliency ratio estimated value based on the harmonic current component on the dc-axis and the harmonic current component on the qc-axis; and
a saliency ratio control unit configured to output a current component that increases or decreases a current command value on a d-axis of a rotor coordinate system, based on a deviation between the saliency ratio estimated value and a predetermined saliency ratio.

2. The power conversion apparatus according to claim 1, wherein
the current detection arithmetic unit outputs an amplitude value of a harmonic current on the dc-axis based on a current on the dc-axis, and outputs an amplitude value of a harmonic current on the qc-axis based on a current on the qc-axis,
the saliency ratio estimation unit outputs the saliency ratio estimated value based on the amplitude value of the harmonic current on the dc-axis and the amplitude value of the harmonic current on the qc-axis, and
the saliency ratio control unit includes a proportional-integral control unit configured to perform proportional-integral control based on the deviation between the saliency ratio estimated value and the predetermined saliency ratio.

3. The power conversion apparatus according to claim 1, wherein
the current detection arithmetic unit calculates an amplitude value of a harmonic current on the dc-axis based on a current component on the dc-axis, and calculates an amplitude value of a harmonic current on the qc-axis based on a current component on the qc-axis,
the saliency ratio estimation unit calculates an inductance estimated value on the d-axis and an inductance estimated value on the q-axis based on the amplitude value of the harmonic current on the dc-axis and the amplitude value of the harmonic current on the qc-axis, and
the saliency ratio estimation unit outputs the saliency ratio estimated value based on the inductance estimated value on the d-axis and the inductance estimated value on the q-axis.

4. The power conversion apparatus according to claim 1, wherein
the saliency ratio control unit includes:
a proportional-integral control unit configured to perform proportional-integral control based on the deviation between the saliency ratio estimated value and the predetermined saliency ratio; and
a d-axis current limit unit configured to hold a limit value of the current command value on the d-axis and to limit the current command value on the d-axis based on the limit value.

5. The power conversion apparatus according to claim 1, further comprising:
an external apparatus configured to input the predetermined saliency ratio.

6. The power conversion apparatus according to claim 1, wherein
the current detection unit detects three-phase currents,
the coordinate conversion unit coordinate-converts the three-phase currents into a current detected value on the dc-axis and a current detected value on the qc-axis, and
the current detection arithmetic unit outputs an amplitude value of a harmonic current on the dc-axis and an average value based on the current detected value on the dc-axis, and also outputs an amplitude value of a harmonic current on the qc-axis and an average value based on the current detected value on the qc-axis.

7. The power conversion apparatus according to claim 1, wherein
the load apparatus comprises a magnet motor, and
the magnet motor is selected from a surface permanent magnet motor in which a permanent magnet is disposed on a surface of a rotor and an interior permanent magnet motor in which a permanent magnet is embedded in a rotor.

8. The power conversion apparatus according to claim 1, further comprising:
a power converter to be connected to the load apparatus; and
a harmonic voltage generation unit configured to output a harmonic voltage on the dc-axis and a harmonic voltage on the qc-axis.

9. The power conversion apparatus according to claim 1, further comprising:
a vector control arithmetic unit configured to output a voltage command on the dc-axis and a voltage command on the qc-axis based on a deviation between a second current command value on the d-axis, to which a current component for increasing or decreasing the current command value on the d-axis is added, and an average value of a harmonic current on the dc-axis, a deviation between a current command value on a q-axis and an average value of a harmonic current on the qc-axis, and a speed estimated value.

10. The power conversion apparatus according to claim 9, further comprising:
a power converter including a switching element; and
a harmonic voltage generation unit configured to generate a harmonic voltage,
wherein
the power converter is controlled based on the harmonic voltage and an output from the vector control arithmetic unit.

11. A power conversion apparatus for controlling a load apparatus by position sensorless control,
the power conversion apparatus comprising:
a saliency ratio estimation unit including
a d-axis inductance reference table holding an inductance estimated value on a d-axis of a rotor coordinate system, the inductance estimated value corresponding to a current command on the d-axis, and
a q-axis inductance reference table holding an inductance estimated value on a q-axis of the rotor coordinate system, the inductance estimated value corresponding to a current command on the q-axis,
the saliency ratio estimation unit being configured to refer to the d-axis inductance reference table and the q-axis inductance reference table based on the current command on the d-axis and the current command on the q-axis to calculate an inductance estimated value on the d-axis and an inductance estimated value on the q-axis,
the saliency ratio estimation unit being configured to output a saliency ratio estimated value based on the inductance estimated value on the d-axis and the inductance estimated value on the q-axis; and
a saliency ratio control unit configured to output a current component that increases or decreases a current command value on the d-axis, based on a deviation between the saliency ratio estimated value and a predetermined saliency ratio.

12. A power conversion apparatus for controlling a load apparatus by position sensorless control,
the power conversion apparatus comprising:
a saliency ratio estimation unit including a saliency ratio reference table holding a saliency ratio estimated value corresponding to a current command on a d-axis of a rotor coordinate system and a current command on a q-axis of the rotor coordinate system,
the saliency ratio estimation unit being configured to refer to the saliency ratio reference table based on the current command on the d-axis and the current command on the q-axis to output the saliency ratio estimated value; and
a saliency ratio control unit configured to output a current component that increases or decreases a current command value on the d-axis, based on a deviation between the saliency ratio estimated value and a predetermined saliency ratio.

13. A power conversion apparatus for controlling a load apparatus by position sensorless control,
the power conversion apparatus comprising:
a current detection unit configured to detect a current passing through the load apparatus;
a current detection arithmetic unit configured to calculate a harmonic current component on a dc-axis as a control axis and a harmonic current component on a qc-axis, based on the detected current;
a saliency ratio estimation unit configured to output a saliency ratio estimated value based on the harmonic current component on the dc-axis and the harmonic current component on the qc-axis; and
a saliency ratio control unit configured to output a command value of a phase error based on a deviation between the saliency ratio estimated value and a predetermined saliency ratio.

* * * * *